G. R. HILL.
COMBINATION POST CARD AND CHECK.
APPLICATION FILED OCT. 30, 1917.
1,264,795.
Patented Apr. 30, 1918.
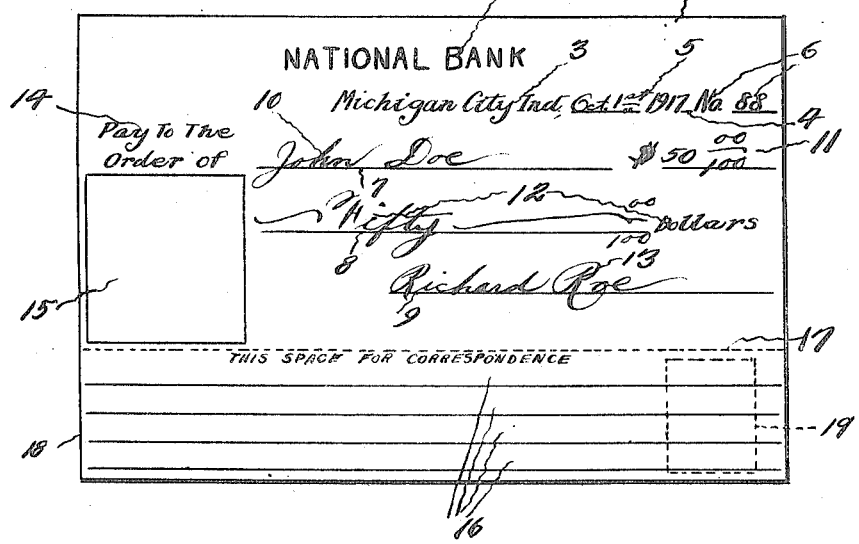
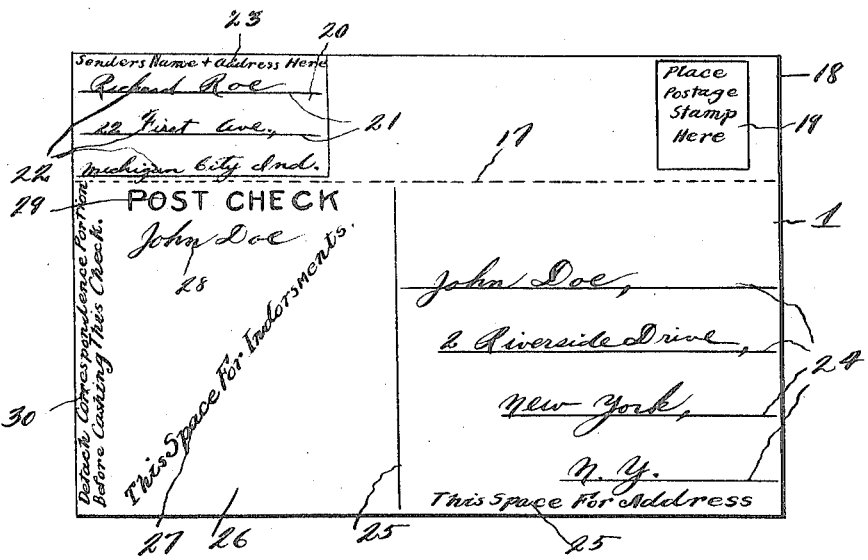

UNITED STATES PATENT OFFICE.

GEORGE R. HILL, OF MICHIGAN CITY, INDIANA.

COMBINATION POST-CARD AND CHECK.

1,264,795.  Specification of Letters Patent.  Patented Apr. 30, 1918.

Application filed October 30, 1917. Serial No. 199,328.

*To all whom it may concern:*

Be it known that I, GEORGE R. HILL, a citizen of the United States, residing at Michigan City, in the county of Laporte, State of Indiana, have invented a new and useful Combination Post-Card and Check; and I do hereby declare the following to be a full, clear, and exact description of the invention, such as will enable others skilled in the art to which it appertains to make and use the same.

This invention relates to a combination postal card and check, and one of the objects of the invention is to provide an article of this kind, whereby a person may pay bills by means of a check, only using one cent postage.

A further object of the invention is to provide an article of stationery manufacture consisting of a card, on one side of which a postal card form is printed and on the other side a check form is printed, there being on the postal card side a space for the indorsement of the payee, and also the address of the payee, and on the check side of the card a space for correspondence and also a space in which may be written data indicating for which the check is drawn.

A further object of the invention is the provision of a scored or perforated line along which the postal card may be torn, whereby the correspondence space portion may be detached from the check portion.

A further object of the invention is the provision of a space on the postal side of the card for directions stating that the correspondence portion must be detached before cashing the check portion.

In practical fields the details of construction may necessitate alterations falling within the scope of what is claimed.

The invention comprises further features and combination of parts as hereinafter set forth shown in the drawings and claimed.

In the drawings:—

Figure 1 is a plan view of the check face of the card.

Fig. 2 is a plan view of the postal card face.

Referring more especially to the drawings 1 designates a card which may be any suitable shape or configuration and size, preferably rectangular, and corresponding to the proportions of the usual postal card. On one side of the card near the top thereof, there is printed the name and address of the bank, to which the card is to be sent, as shown at 2 and 3. A suitable line 4 for the date 5 on which the card is written. Also on the same side at the top thereof the number 6 of the card is also printed. On the same face of the card having the name of the bank, there are three lines 7, 8 and 9 on the upper one of which, the name 10 of the payee is to be written and at the end of this line there is a space 11 to receive the amount in figures, to be paid to the payee. The second line 8, is designed to receive the amount in words as indicated at 12, to be paid to the payee. The lower line 9 is for the reception of the name of the maker of the check, as shown at 13. The words "Pay-to-the-order-of" as shown at 14 are printed adjacent to the line 7. Also on the check face of the card a space 15 is provided to contain data indicating the amount for which the check is drawn. In other words should the maker draw the check to pay rent or the like, it may be written in the space 15, "Rent for the month of", for instance, March, April or the like. The lower part of the check face of the card is provided with a plurality of lines 16, on which certain correspondence may be written by the maker of the check to the payee thereof. A perforated or scored line 17 is provided on the check face of the card, on which line the correspondence portion 18 of the card may be detached. On the reverse or postal face of the card, as shown in Fig. 2, there is a space for the reception of a postage stamp, and opposite this space is another space 20 having lines 21 on which the name and address of the maker or sender may be written as indicated at 22. Also in this space 21 there are directions 23 stating that the name of the maker is to be written on the lines 21. This space 20 and the stamp space 19 are printed on the reverse side of the correspondence portion of the side of card, so that when the correspondence portion of the card is detached the stamp portion is also detached. On the lower right hand portion of the postal card face there are lines 24 for the name and address of the person to whom the card is to be sent and to whom the check is to be paid. Below the lines 24 there are the words 25 stating "This space for the address" are printed. The postal card face is divided by the line 25 thereby affording a space 26, on which is printed the words 27 "This space for indorsement".

Therefore the indorsement of the payee, say for instance "John Doe" 28 is written below the words 29 "Post check". The words "Detach correspondence portion before cashing this check", is also printed in the space 26 toward the left, as indicated at 30. It is to be observed that the maker fills in the name to whom the card is to be sent on the lines 24, then the maker writes his own name in the space 20. The check face of the card is then filled out in the usual manner, for instance as shown at Fig. 1, stating in the space 15 for what the check is drawn, while the necessary correspondence to the payee is written on the lines 16. The payee upon receiving the card detaches the correspondence portion and then deposits the check portion, first having indorsed it in the proper place. After the check has been paid and the maker's account balanced in the usual manner, he receives the indorsed paid check portion of the card.

The invention having been set forth what is claimed as new and useful is:—

1. In an article of stationery, a card having a postal card face and a check face, said check face having a space for data indicating for what the check is made and paid, said card having a correspondence portion detachably connected to the body of the card by means of a perforated or scored line, the reverse face of the correspondence portion having a stamp space and a space for the address of the sender or the maker, the opposite face of the check portion of the card having spaces for the name and address of the payee and his indorsement.

2. As a new article of stationery manufacture, a card corresponding to the proportions of the usual postal card, said card at a point substantially one third of the width of the card having a perforated or scored line, thereby dividing one side of the card into a check face and a correspondence face hence providing a body section and a detachable stub section, the correspondence face of which having horizontally ruled lines, the check face of the body section having a space adapted to receive data indicating for what the check is made and paid when the check is returned, the other side of the body section being divided into address and indorsement spaces, said stub section on the side opposite its correspondence face having a stamp space and a ruled space for the name of the sender or maker of the check body.

In testimony whereof I have signed my name to this specification in the presence of two subscribing witnesses.

GEORGE R. HILL.

Witnesses:
  FRANK T. HENRY,
  HENRY F. WACKENFIELD.